United States Patent
Hirano et al.

(10) Patent No.: US 7,804,663 B2
(45) Date of Patent: Sep. 28, 2010

(54) HIGH FREQUENCY INTERCONNECT SIGNAL TRANSMISSION LINES

(75) Inventors: Toshiki Hirano, San Jose, CA (US); Nobumasa Nishiyama, Yokohama (JP); Haruhide Takahashi, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 951 days.

(21) Appl. No.: 11/643,269

(22) Filed: Dec. 20, 2006

(65) Prior Publication Data

US 2008/0151432 A1    Jun. 26, 2008

(51) Int. Cl.
G11B 5/48    (2006.01)
(52) U.S. Cl. .................................... 360/245.9
(58) Field of Classification Search ............... None
See application file for complete search history.

(56) References Cited

U.S. PATENT DOCUMENTS

| | | | | |
|---|---|---|---|---|
| 5,699,212 A * | 12/1997 | Erpelding et al. | ......... | 360/245.8 |
| 5,768,062 A * | 6/1998 | Anderson et al. | ......... | 360/245.9 |
| 5,796,552 A | 8/1998 | Akin et al. | | |
| 6,038,102 A | 3/2000 | Balakrishnan et al. | | |
| 6,055,132 A | 4/2000 | Arya et al. | | |
| 6,125,015 A * | 9/2000 | Carlson et al. | ........... | 360/245.9 |
| 6,262,868 B1 | 7/2001 | Arya et al. | | |
| 6,275,358 B1 | 8/2001 | Balakrishnan et al. | | |
| 6,351,354 B1 * | 2/2002 | Bonin | .................... | 360/294.6 |
| 6,404,595 B1 | 6/2002 | Iwamoto | | |
| 6,414,820 B1 | 7/2002 | Coon et al. | | |
| 6,424,499 B1 | 7/2002 | Balakrishnan et al. | | |
| 6,424,500 B1 | 7/2002 | Coon et al. | | |
| 6,493,190 B1 | 12/2002 | Coon | | |
| 6,714,385 B1 | 3/2004 | Even et al. | | |
| 6,741,426 B2 * | 5/2004 | Girard | ..................... | 360/245.4 |
| 6,762,913 B1 * | 7/2004 | Even et al. | ................... | 360/246 |
| 6,943,991 B2 * | 9/2005 | Yao et al. | ................. | 360/294.4 |
| 6,944,936 B2 * | 9/2005 | Krinke | ..................... | 29/603.04 |
| 7,006,331 B1 * | 2/2006 | Subrahmanyam et al. | ....................... | 360/245.9 |
| 7,372,669 B2 * | 5/2008 | Deguchi et al. | .......... | 360/245.9 |
| 7,403,357 B1 * | 7/2008 | Williams | ................. | 360/245.9 |
| 7,450,342 B2 * | 11/2008 | White et al. | ............. | 360/234.5 |
| 2005/0078415 A1 * | 4/2005 | Tsuchiya et al. | ......... | 360/245.8 |

OTHER PUBLICATIONS

Gao, X. K., et al., "Robust Design of Head Interconnect for Hard Disk Drive", mhtml:file://X:\Searches\HCHI\015\search%20records\final\Non-Patent%20Literature\Robust%20design..., (May 15, 2005),1.
Guo, W. , et al., "Dual Stage Actuators for High Density Rotating Memory Devices", *IEEE Transactions on Magnetics*, vol. 34, No. 2, (Mar. 1998),450-455.
Jury, Jason C., et al., "Designing Disk Drive Interconnects to Obtain a Desired Transmitted Write Current Waveform", *IEEE Transactions on Magnetics*, vol. 38, No. 1, (Jan. 2002),55-60.
Klaassen, Klaas B., et al., "Read/Write Electronics Front-End Systems for Hard Disk Drives", *IEEE Transactions on Magnetics*, vol. 40, No. 1, (Jan. 2004),263-268.

* cited by examiner

*Primary Examiner*—Mark Blouin

(57) ABSTRACT

A micro-electromechanical signal transmission line is made from an electrically conductive material. It has a first distal end and a second distal end. The second distal end is free to move with respect to said first distal end. There exists an unsupported region between the first distal end and the second distal end. The unsupported region is juxtaposed at a controlled distance from at least one grounded conductive surface.

20 Claims, 9 Drawing Sheets

HIGH FREQUENCY INTERCONNECT SIGNAL TRANSMISSION LINES

TECHNICAL FIELD

This invention relates generally to the field of direct access storage devices and in particular to high frequency transmission lines for connecting two devices that move relative to each other.

BACKGROUND ART

Direct access storage devices (DASD) have become part of everyday life, and as such, expectations and demands continually increase for greater speed for manipulating and for holding larger amounts of data. To meet these demands for increased performance, the mechano-electrical assembly in a DASD device, specifically the Hard Disk Drive (HDD) has evolved to meet these demands.

Advances in magnetic recording heads as well as the disk media have allowed more data to be stored on a disk's recording surface. The ability of an HDD to access this data quickly is largely a function of the performance of the mechanical components of the HDD. Once this data is accessed, the ability of an HDD to read and write this data quickly is a primarily a function of the electrical components of the HDD.

FIG. 1 (Prior Art) shows HDD 100 with its cover removed to allow the internal components of HDD 100 to be visible. Actuator assembly 120 pivots about pivot bearing 145 and moves magnetic head 125 arcuately across disk surface 130 to record and retrieve data from concentric circles of data known as data tracks 135. To allow more data to be stored on disk surface 130, more data tracks must be stored more closely together.

The quantity of data tracks 135 recorded on disk surface 130 is determined partly by how well magnetic head 125 can be positioned and made stable over a desired data track 135. The quantity of data tracks 135 is a direct indicator of the amount of data stored in HDD 100. Vibration or unwanted relative motion between the magnetic head 125 and disk surface 130 will affect the quantity of data tracks 135 recorded on disk surface 130.

Although the mass, stiffness and geometry of the components in actuator assembly 120 directly affect the stable positioning of magnetic head 125, vibration energy that acts on actuator assembly 120 and disk surface 130 is also a major factor in the stable positioning of magnetic head 125. If excessive, vibration energy will impart oscillating motion to actuator assembly 120 and move magnetic head 125 from a desired position over data tracks 135.

There are many sources of vibration energy in an HDD, e.g. air from the disk impinging on actuator assembly 120, vibration from spindle motor 140, or external motion coming into HDD 100. Aside from these sources of vibration energy, actuator assembly 120 can cause itself to vibrate in an uncontrolled manner. While performing its function of moving magnetic head 125 arcuately across disk surface 130, the components and/or structure of actuator assembly 120 can begin to vibrate and prevent magnetic head 125 from arriving in a timely manner, or settle in, and following a desired data track 135.

In an effort to mitigate unwanted relative motion between the magnetic head 125 and disk surface 130, HDD manufacturers are beginning to configure HDDs with a secondary actuator in close proximity to magnetic head 125. A secondary actuator of this nature is generally referred to as a microactuator because it typically has a very small actuation stroke length, typically plus and minus 1 micron. A microactuator typically allows faster response to relative motion between magnetic head 125 and data track 135 as opposed to moving the entire structure of actuator assembly 120.

Micro actuator 150 makes it possible for a magnetic head 125 to settle in on a data track 135 while most of actuator assembly 120 and/or disk surface 130 could possibly be vibrating as a result of the actuation process or external vibration energy. An additional requirement of microactuator 150 is to provide a conveyance means for written and read data to be transferred from magnetic head 125 to outside HDD 100 via connector 117.

Microactuator 150 is part of the data transfer circuit that comprises in part: magnetic head 125, conductors on suspension 180, flex cable 110, and arm electronics (A/E) 115. All components of the data transfer circuit must be able to transfer data at a prerequisite data rate or frequency. HDD customers are demanding higher data rates to enable them to manipulate data faster. Today's data rate targets are in the range of 1-3 GHz (Giga-hertz). In this data rate range and above, the impedance of the data transfer circuit, sometimes referred to as a transmission line, becomes a concern for achieving these high data rates.

The problem for microactuator designers is to devise a conveyance means for written and read data that can convey high data rates from magnetic head 125 to suspension 180, while magnetic head 125 is moving relative to suspension 180.

SUMMARY OF THE INVENTION

Various embodiments of the present invention are described herein. A micro-electromechanical signal transmission line is made from an electrically conductive material. It has a first distal end and a second distal end. The second distal end is free to move with respect to said first distal end. There exists an unsupported region between the first distal end and the second distal end. The unsupported region is juxtaposed at a controlled distance from at least one grounded conductive surface.

BRIEF DESCRIPTION OF THE DRAWINGS

The accompanying drawings, which are incorporated in and form a part of this specification, illustrate embodiments of the invention and, together with the description, serve to explain the principles of the invention.

Prior Art

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected within. The discussion will then focus on embodiments of the invention that allow high frequency transmission lines to connect a magnetic recording transducer to a suspension while there is relative motion between the two. The discussion will then focus on embodiments of this invention that allow for the grooming of the electrical characteristics, primarily impedance, of the high frequency interconnect transmission lines to match the impedance of the total data transfer circuit. Finally fabrication of the high frequency interconnect signal transmission lines will be discussed. Although the high frequency interconnect signal transmission lines will be described in a microactuator, it is understood that the embodiments described herein are useful outside of the art of microactuators, such as devices requiring high frequency transmission between two devices that have relative motion. The utilization of the high frequency interconnect signal transmission lines in a microactuator is only one embodiment and is provided herein merely for purposes of brevity and clarity.

Overview

Figure 1:
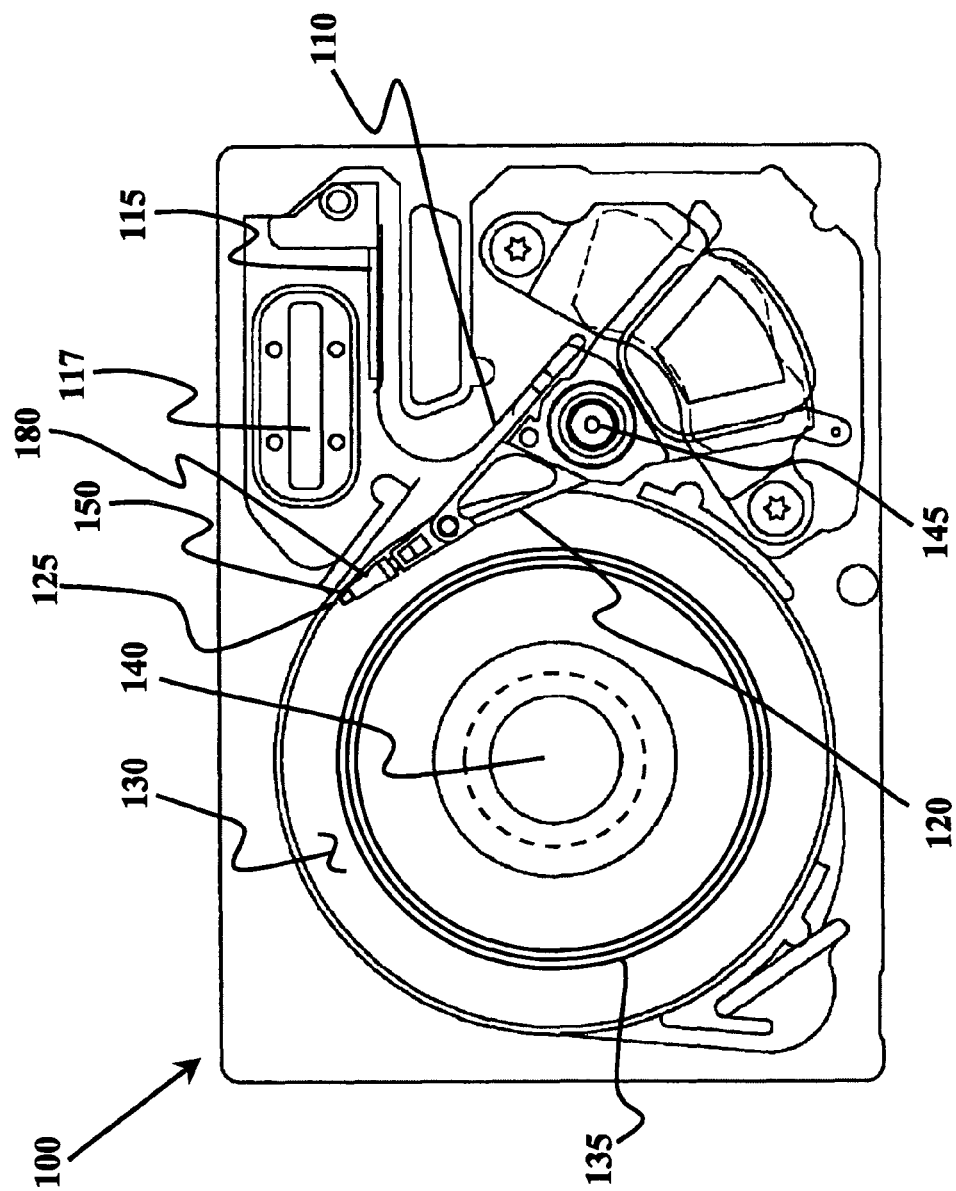
FIG. 1 is a plan view of an HDD with cover and top magnet removed.
Figure 2:
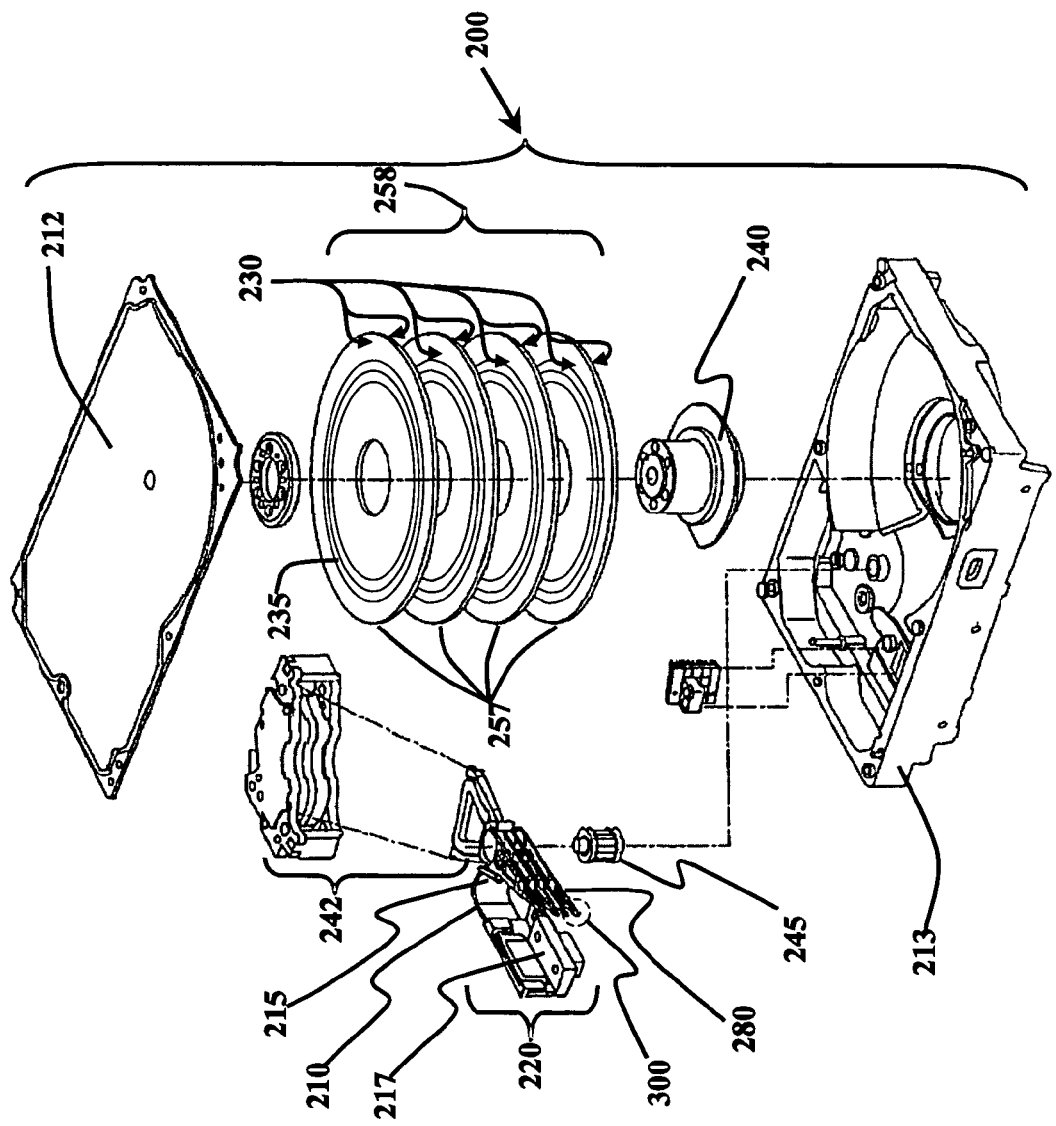
FIG. 2 is an isometric blow-apart of an HDD in accordance with one embodiment of the present invention.

With reference to FIG. 2, an isometric blow-apart of HDD 200 is shown in accordance with an embodiment of this invention. Base casting 213 provides coupling points for components and sub-assemblies such as disk stack 258, voice coil motor (VCM) 242, and actuator assembly 220. Disk stack 258 is coupled to base casting 213 by means of motor-hub assembly 240. Motor hub assembly 240 will have at least one disk 257 coupled to it whereby disk 257 can rotate about an axis common to motor-hub assembly 240 and the center of disk 257. Disk 257 has at least one surface 230 upon which reside data tracks 235.

Figure 3:
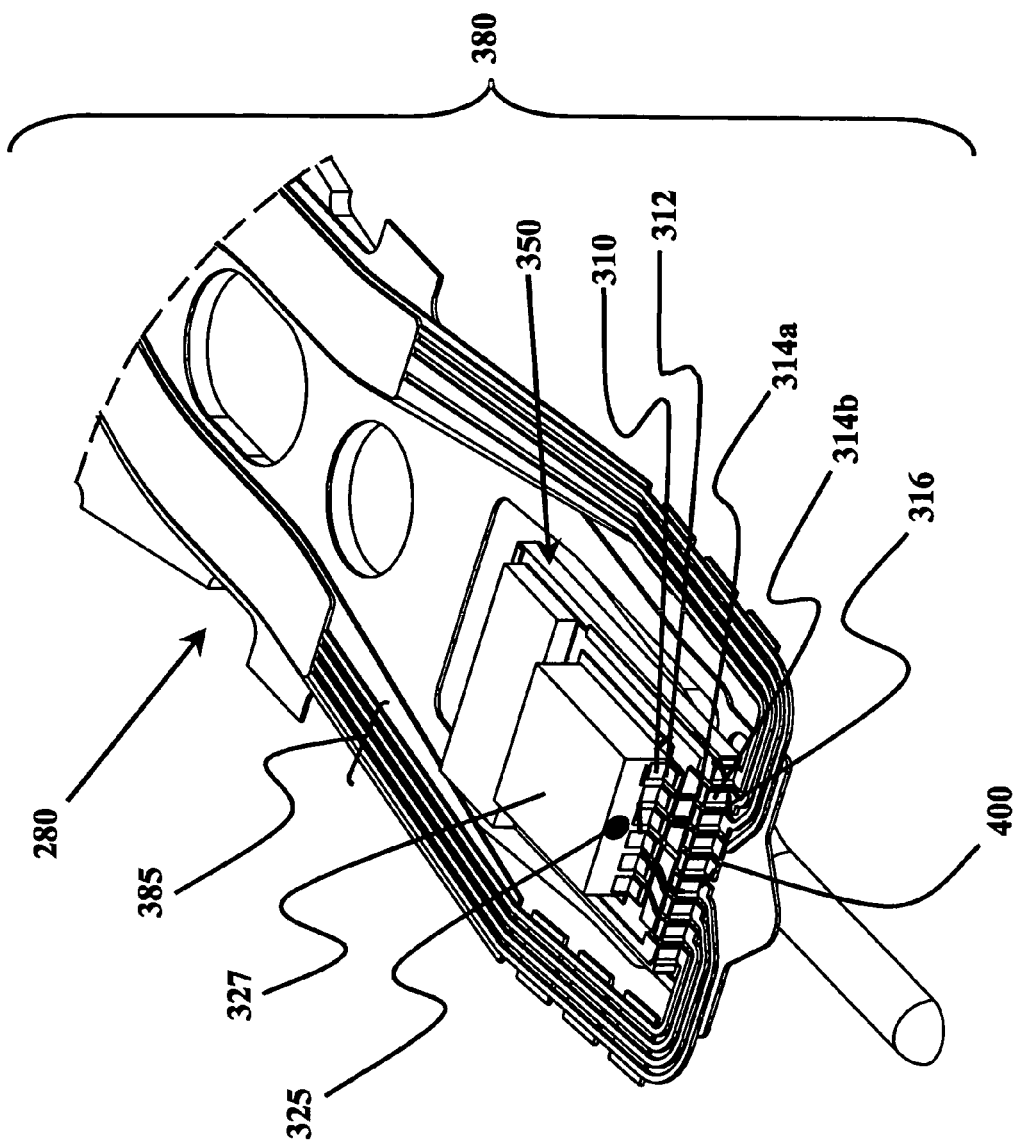
FIG. 3 is an isometric detail of an HGA in accordance with one embodiment of the present invention.

With reference now to FIGS. 2 and 3, actuator assembly 220 comprises in part connector 217, which conveys data between arm electronics (A/E) 215 and a host system wherein HDD 200 resides. Flex cable 210, which is part of actuator assembly 220, conveys data between connector 217 and A/E 215. A/E 215 performs the electronic functions of actuator assembly 220 such as, switching between reading and writing functions of magnetic head 325, upon magnetic head 325 reading data tracks 235 amplifying the read data, and providing current to magnetic head 325 for writing data tracks 235. Also part of actuator assembly 220 is suspension 280. Suspension 280 comprises in part conductors 385 that convey data signals between magnetic head 325 and A/E 215.

Actuator assembly 220 is coupled pivotally to base casting 213 by means of pivot bearing 245, whereby VCM 242 can move magnetic head 325 arcuately across data tracks 235. Upon assembly of actuator assembly 220, disk stack 258, VCM 242, and other components with base casting 213, cover 212 is coupled to base casting 213 to enclose these components and sub-assemblies into HDD 200.

With reference to FIG. 3, detail 300 is the most distal end of the assembly comprising suspension 280, slider 327 and any other components attached to suspension 280, such as microactuator 350. When these components are coupled together, as an assembly they are known as a head gimbal assembly or HGA 380. When microactuator 350 is situated under slider 327 and between suspension 280 it moves slider 327 with respect to suspension 280, in accordance to the position of data tracks 235.

Figure 4:
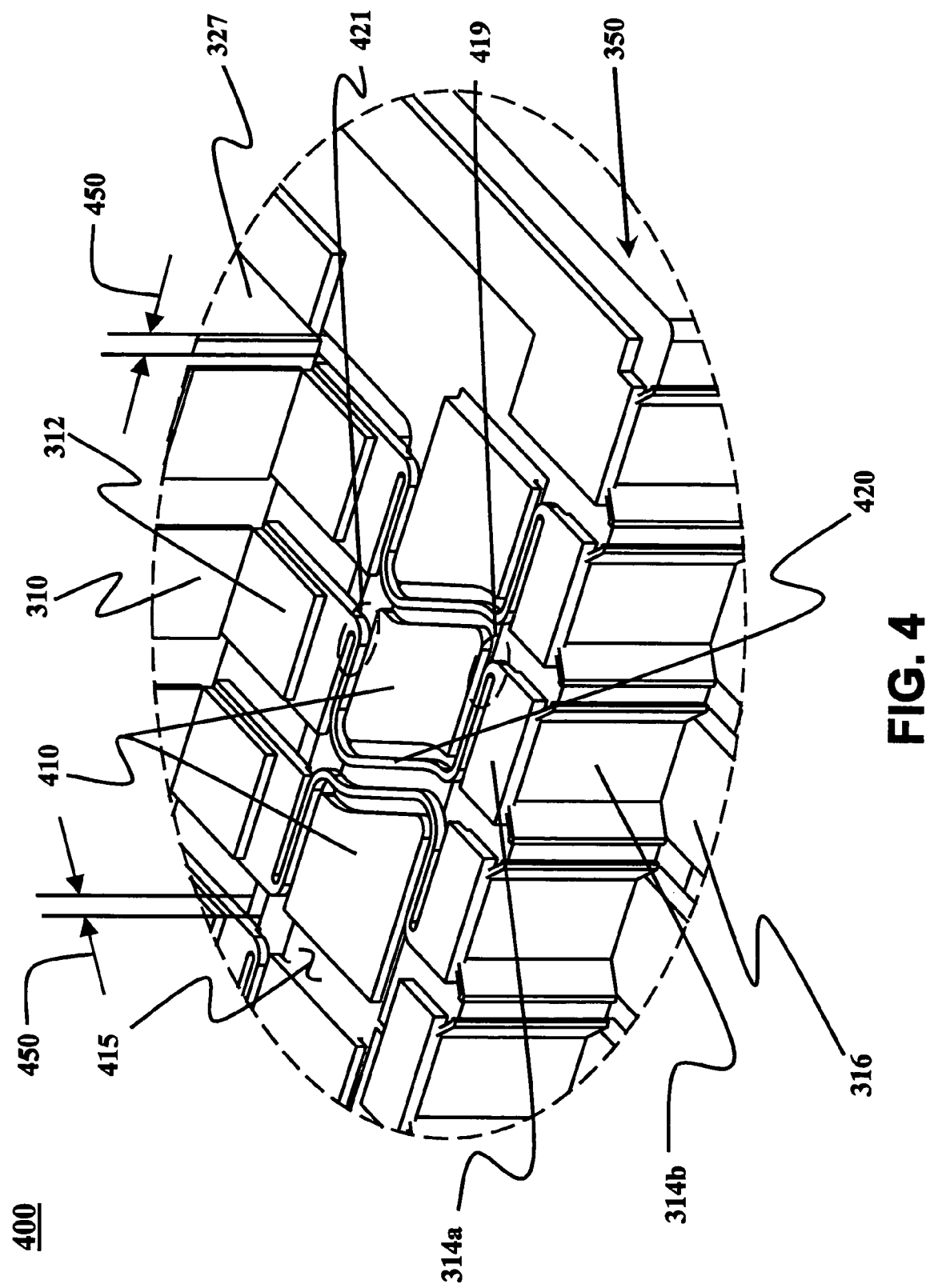
FIG. 4 is an isometric detail of high frequency interconnect signal transmission lines in accordance with one embodiment of the present invention.

With reference to FIG. 3 and FIG. 4, channel 450 in microactuator 350 allows termination pad 312 and slider 327 to move relative to termination pad 314a and 314b. Termination pad 314b is fabricated at a right angle and is coupled to termination pad 314a, thereby allowing electrical coupling between termination pad 316 of conductors 385 and microelectromechanical signal line 420.

In addition to moving slider 327, microactuator 350 also provides a means for conveying read and write data signals to and from magnetic head 325 to conductors 385. Conveyance of read and write data signals is accomplished in part via termination pad 310 on slider 327, termination pads 312, 314a, and 314b on microactuator 350, and termination pad 316 on conductors 385. In conjunction with the aforementioned termination pads, high frequency interconnect signal transmission lines convey read and write data signals from magnetic head 325 to conductors 385. The high frequency interconnect signal transmission lines are fabricated with techniques used for fabricating MEMS (micro-electromechanical system) devices. Flexible micro-electromechanical signal line 420 (FIG. 4) is one such a high frequency signal line.

With reference to FIG. 3 and FIG. 4 and in accordance with an embodiment of the present invention, flexible micro-electromechanical signal line 420 is electrically coupled at a first distal end 419 to an external transmission line and is electrically coupled to a second distal end 421 to an electronic device. Magnetic head 325 is exemplary of an electronic device that requires a means for conveying a signal flexibly between two relatively moving termination pads. One schooled in the art will recognize that there are other electronic devices that can benefit from the embodiment of the present invention. The application of magnetic head 325 to the embodiment of the present invention is done for the purpose of brevity and clarity. Suspension 280 is shown to be an integrated lead suspension (ILS). The spirit of the embodied invention when applied to HDD 200 encompasses any form or type of suspension. An ILS is depicted only for the sake of brevity and clarity.

In general, when electrical coupling is required for the assembly of HGA 380 it is preferred to use a technique that imparts the least amount of force to HGA 380. HGA 380 is a very delicate device that will not perform properly if subjected to forces that cause deformation of its components. In accordance with an embodiment of the present invention, electrical coupling is provided from termination pad 310 to termination pad 312 to couple magnetic head 325 to the second distal end 421 of micro-electromechanical signal line 420; and electrical coupling is provided from termination pad 314b to termination pad 316 to couple first distal end 419 of micro-electromechanical signal line 420 to conductors 385.

In accordance with an embodiment of the present invention, reflowing solder is used for electrically coupling termination pad 310 to termination pad 312, and termination pad 314b to termination pad 316. There are several techniques for reflowing solder. The following is presented only as examples of solder reflow techniques and is not intended to limit the scope of the embodiment of the present invention.

There are many solder reflow techniques. They include, but are not limited to: placing a solder preform, such as a solder ball in the corner between termination pads 310 and 312 or termination pads 314b and 316, followed with the application of heat from, e.g. a laser, a focused infrared light, and an oven; and tinning termination pads 310 and 312 or termination pads 314b and 316 prior to assembly of HGA 380, followed with the application of heat from, e.g. a laser, a focused infrared light, and an oven. Tinning, which is the technique of applying a film of solder on a surface is varied and well known in the art.

Physical Description

With reference to FIG. 4 and in accordance with an embodiment of the present invention, detail 400 presents a flexible micro-electromechanical signal line 420 coupled to microactuator 350 at a first distal end 419 to termination pad 312 and at a second distal end 421 to termination pad 314a. Micro-electromechanical signal line 420 as well as termination pads 312, 314a and 314b comprise an electrically conductive material typically copper, silver or gold. Any electrically conductive material can be used that is conducive to a process for fabricating a micro-electromechanical signal line. Copper, silver and gold are given as examples because of their high electrical conductivity and because they are conducive to depositing with a plating process. Copper, silver and gold are only presented as examples of electrically conductive material and are not intended to limit the embodiment of the present invention.

In accordance with an embodiment of the present invention, micro-electromechanical signal line 420 is made flexible. Flexibility is made possible due to its freedom from attachment and support between termination pad 312 and termination pad 314a. Micro-electromechanical signal line 420 is only attached and supported at termination pad 312 and termination pad 314a. It is also circuitously routed between termination pad 312 and termination pad 314a whereby the length of micro-electromechanical signal line 420 is provided in excess of a minimum length required for spanning between termination pad 312 and termination pad 314a. This excess length allows unimpeded relative motion between termination pad 312 and termination pad 314a.

In accordance with an embodiment of the present invention, micro-electromechanical signal line 420 allows for high frequency data to be transmitted from termination pad 312 to termination pad 314a. Typically to allow high frequency data transmission, the electrical impedance of micro-electromechanical signal line 420 requires that its characteristic impedance be matched to the other components of the data transfer circuit, which have usually been groomed for high frequency data transmission. In addition to micro-electromechanical signal line 420, the components of the data transfer circuit comprise in part: magnetic head 325, termination pads 310, 312, 314a, 314b, and 316, conductors 385, flex cable 210, arm electronics (A/E) 215 and connector 217.

In accordance with an embodiment of the present invention, controlling the distance of the unsupported length between termination pad 312 and termination pad 314a to at least one grounded surface, grooms the impedance of micro-electromechanical signal line 420. Controlling the distance to ground will be explained in detail in the next section of the Detailed Description. Ground plane 415 is electrically conductive and connected to ground through a termination pad 314b. Ground plane 415 is generally parallel and juxtaposed to a plane that contains the plane in which micro-electromechanical signal line 420 resides.

Ground structures 410 are electrically conductive and are coupled to ground plane 415. Where the side surfaces of ground structures 410 are juxtaposed to micro-electromechanical signal line 420, the grounded conductive surfaces of ground structures 410 are approximately equidistant to micro-electromechanical signal line 420. The grounded conductive surfaces of ground structures 410 approximately follow the circuitous route of micro-electromechanical signal line 420.

Operation

Figure 5:
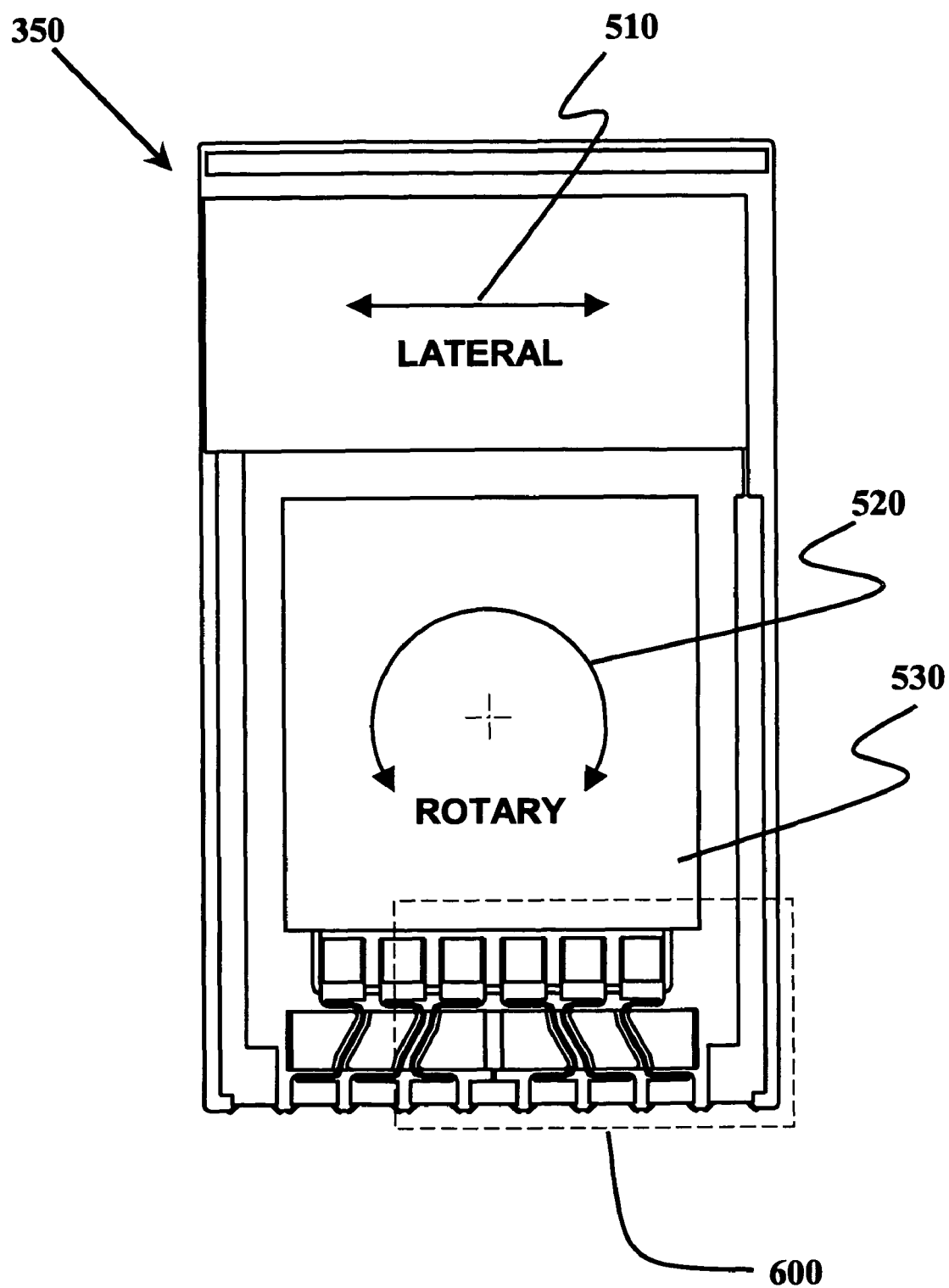
FIG. 5 is a plan view of a microactuator in accordance with one embodiment of the present invention.

With reference now to FIG. 5 microactuator 350 is presented in plan view in accordance with an embodiment of the present invention. A portion of microactuator 350 can provide lateral motion 510. Another portion of microactuator 350 can provide rotary motion 520. Mounting surface 530 provides a surface on which slider 327 can be mounted.

Figure 6:
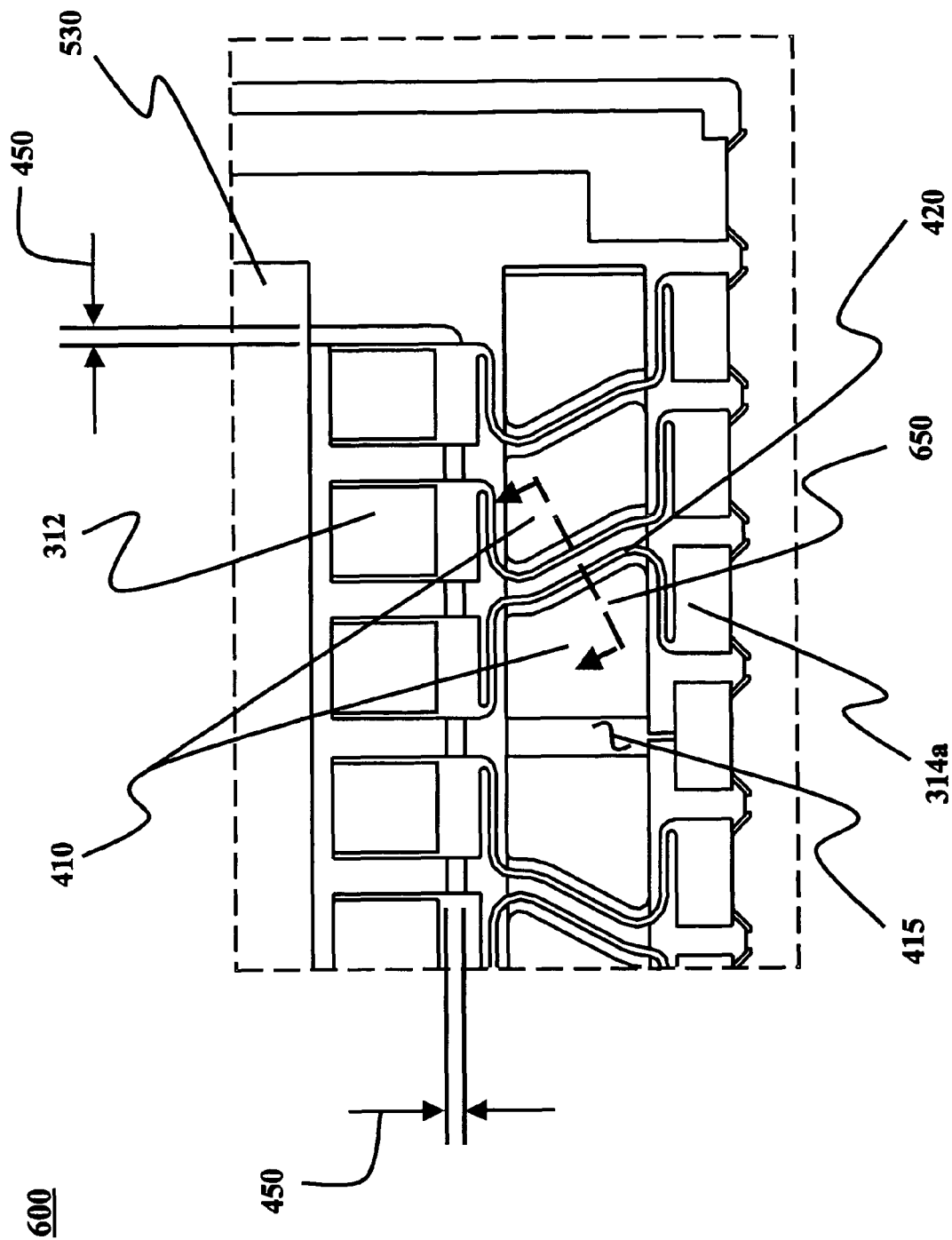
FIG. 6 is a plan view detail of high frequency interconnect signal transmission lines in accordance with one embodiment of the present invention.

With reference to FIG. 5 and FIG. 6, detail 600 presents a plan view and relative positions of termination pads 312 and 314a, ground structures 410 and channel 450. Section-line 650 bisects micro-electromechanical signal line 420, ground structures 410, and ground plane 415.

Figure 7:
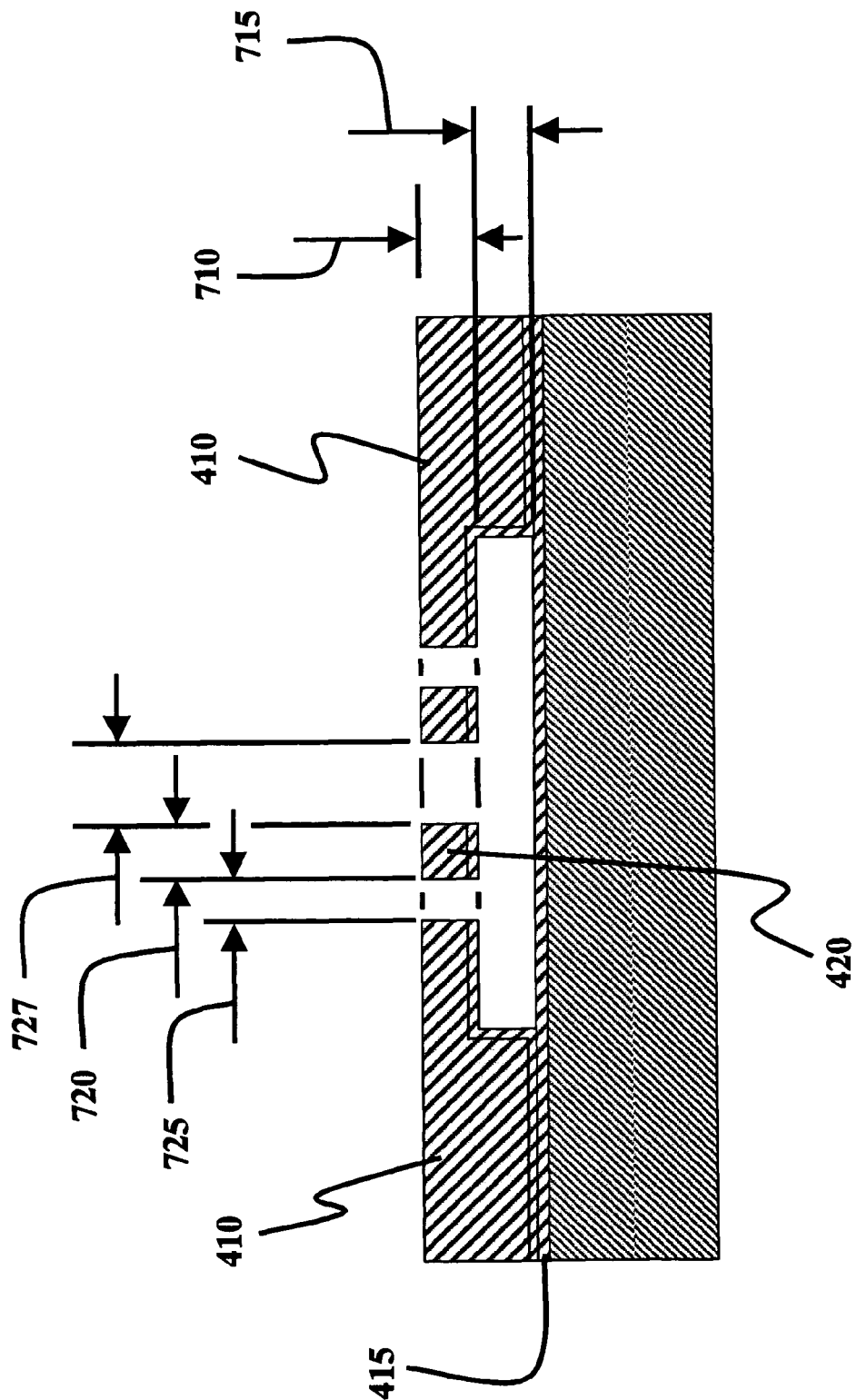
FIG. 7 is a cross-section of high frequency interconnect signal transmission lines in accordance with one embodiment of the present invention.

With reference to FIG. 7 and in accordance with an embodiment of the present invention, cross-section 700, which results from section-line 650, reveals the thickness, width, and spacing relationships between micro-electromechanical signal line 420, ground structures 410, and ground plane 415. By controlling these relationships, the characteristic impedance of micro-electromechanical signal line 420 can be groomed to match the impedance of the data transfer circuit.

It is well known in the art that for a signal transmission line operating approximately below 1 GHz, data transmission is mainly impeded by the resistance of the transmission line. At frequencies approximately greater than 1 GHz, other components of impedance become relevant. The impedance caused by capacitance in the transmission line, and impedance caused by the inductance in the transmission line become major concerns for data transmission. The impedance resulting from the resistance of the transmission line is not affected by frequency whereas the impedance from the capacitance and inductance, known as reactance are affected by frequency.

Inductive reactance is directly proportional to the magnetic flux produced by a current being carried by a transmission line, known as inductance, and the frequency of the current. With changing current the magnetic field generates an electromotive force, which resists the changes, or frequency of the current. As frequency and/or inductance increase, so does the signal transmission line inductive reactance.

Capacitive reactance, unlike inductive reactance, is inversely proportional to the capacitance of the transmission line and the frequency of the current. As frequency and/or capacitance increase, capacitive reactance of the signal transmission line decreases. This is primarily due to the electron potential across a capacitor's electrodes changing with alternating current and in effect passing electrons (current) as the current alternates. The faster the alternating current, or frequency, the more current is passed through the capacitor.

Resistance of a signal transmission line is important to the impedance of the data transfer circuit. Resistance of a signal transmission line, i.e. the micro-electromechanical signal transmission line in the embodiment of the present invention, is typically established by the thickness, width, length, and resistivity of the material from which the signal transmission line is made. In light of a high frequency interconnect signal transmission line that is a micro-electromechanical signal transmission line, the resistance of the of micro-electromechanical signal transmission line is established in concert with the total impedance of the data transfer circuit.

Taking advantage of capacitive reactance and inductive reactance being in opposite phases with each other, it is the intent of another embodiment of the present invention to groom the capacitive reactance so that the impedance of micro-electromechanical signal line 420 matches the impedance of the data transfer circuit.

With reference again to FIG. 7, and in accordance with an embodiment of the present invention the capacitive reactance is groomed by adjusting thickness 710, distance 715, width 720, distance 725, and distance 727.

Thickness 710 is the thickness of micro-electromechanical signal line 420 as well as the thickness of ground structures 410 that is juxtaposed to micro-electromechanical signal line 420. Adjusting thickness 710 is analogous to adjusting the surface area of a capacitor plates.

Distance 715 is the distance between ground plane 415 and micro-electromechanical signal line 420. Adjusting distance 715 is analogous to adjusting the distance between capacitor plates.

Width 720 is the width of micro-electromechanical signal line 420. Adjusting width 720 is analogous to adjusting the surface area of a capacitor plates.

Distance 725 is the distance between ground structures 410 and micro-electromechanical signal line 420. Adjusting distance 725 is analogous to adjusting the distance between capacitor plates.

Distance 727 is the distance between adjacent micro-electromechanical signal line 420. One micro-electromechanical signal line 420 may not carry current or may have an electrical potential close to ground. Adjusting distance 727 is analogous to adjusting the distance between capacitor plates.

Figure 8:
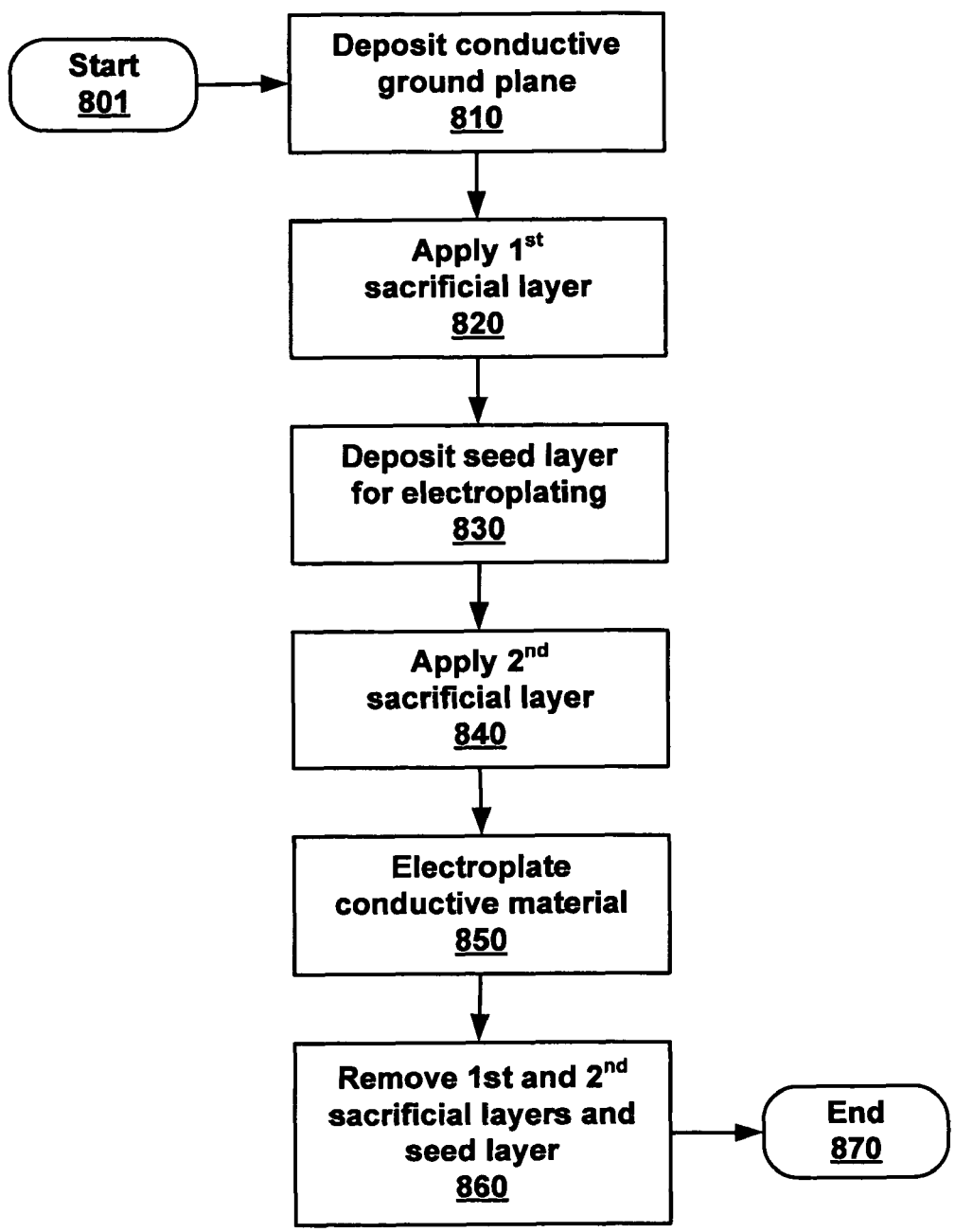
FIG. 8 is a flow chart illustrating steps of a fabrication process for high frequency interconnect signal transmission lines in accordance with one embodiment of the present invention.
Figure 9:
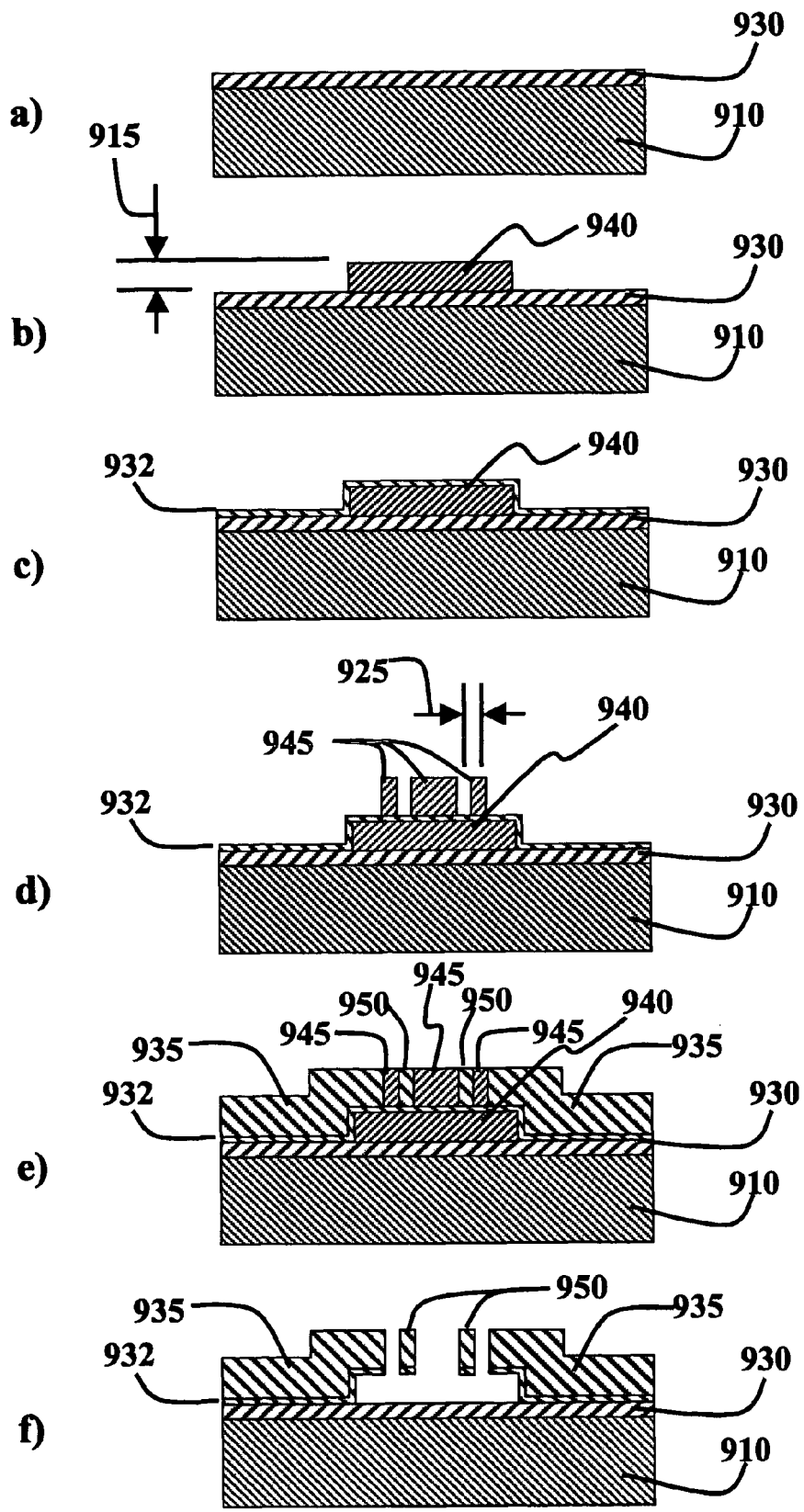
FIG. 9 (*a-f*) are cross-sections of high frequency interconnect signal transmission lines at process steps of fabrication in accordance with one embodiment of the present invention.

FIG. 8 is a flow chart of a process 800 in which particular steps are performed in accordance with an embodiment of the present invention for fabricating a micro-electromechanical signal transmission line suitable for high frequency interconnect signal transmission. FIG. 9 presents cross-sections of an exemplary high frequency interconnect signal transmission lines, e.g. micro-electromechanical signal transmission line, at sequential process steps of fabrication presented in process 800 of FIG. 8. Although specific steps are disclosed in process 800, such steps are exemplary. That is, the present invention is well suited to performing various other steps or variations of the steps recited in FIG. 8. Within the present embodiment, it should be appreciated that the steps of process 800 may be performed by software, by hardware, by an assembly mechanism, through human interaction, or by any combination of software, hardware, assembly mechanism, and human interaction.

Process 800 will be described with reference to elements shown in FIG. 4, FIG. 6, FIG. 7, and FIGS. 9a-9f.

In step 801 of process 800, a suitable substrate 910 (FIG. 9a) is introduced into process 800 in an embodiment of the present invention. A suitable substrate for a MEMS process such as process 800 is typically silicon. Other substrates such as glass, quartz or ceramic may also be suitable for process 800.

In step 810 of process 800, and presented in FIG. 9a, conductive ground plane 930 is deposited in an embodiment of the present invention. A typical ground plane may comprise an adhesion layer such as chromium or titanium possibly followed by a layer of copper or gold. The usual deposition technique for these materials is known in the industry as sputter deposition. Other deposition techniques may also be used such as chemical vapor deposition (CVD), electro-plating or evaporation.

In step 820 of process 800, and presented in FIG. 9b, first sacrificial layer 940 is applied above ground plane 930 in an embodiment of the present invention. Thickness 915 of first sacrificial layer 940 is predefined and will determine, for example, the distance of micro-electromechanical signal transmission line 420 to ground plane 415, such that a selected impedance in micro-electromechanical signal transmission line 420 is controlled. A typical first sacrificial layer may be photoresist or photosensitive polyimide. Other materials that can be a suitable first sacrificial layer are materials that can be applied to a controlled thickness, imaged to a controlled feature size, and selectively removed.

In step 830 of process 800, and presented in FIG. 9c, seed layer 932 is deposited that is conducive to an electroplating process to follow in an embodiment of the present invention. Seed layer 932 covers first sacrificial layer 940 and ground plane 930. A typical seed layer may comprise an adhesion layer such as chromium or titanium followed by an electrically conductive material such as copper or gold. The usual deposition technique for these materials is known in the industry as sputter deposition. Other deposition techniques may also be used such as chemical vapor deposition (CVD) or evaporation.

In step 840 of process 800, and presented in FIG. 9d, second sacrificial layer 945 is applied above selected portions of seed layer 932 in an embodiment of the present invention. Width 925 of second sacrificial layer 945 is predefined and will determine, for example the distance of micro-electromechanical signal transmission line 420 to ground plane on ground structure 410, such that a selected impedance in micro-electromechanical signal transmission line 420 is controlled. A typical second sacrificial layer may be photoresist or photosensitive polyimide. Other materials that can be a suitable second sacrificial layer are materials that can be applied to a controlled thickness, imaged to a controlled feature size, and selectively removed.

In step 850 of process 800, and presented in FIG. 9e, conductive material is electroplated onto exposed portions of seed layer 932 to form micro-electromechanical signal transmission lines 950 and ground structures 935 in an embodiment of the present invention. It should be obvious to one skilled in the art of thin film processing that other methods of applying conductive material are available. In another embodiment of the present invention electroless plating is used to apply a conductive material.

In step 860 of process 800, and presented in FIG. 9f, first sacrificial layer 940, seed layer 932 and second sacrificial layer 945 are removed in an embodiment of the present invention. A typical method for removing first sacrificial layer 940 and second sacrificial layer 945 is by immersing first sacrificial layer 940 and second sacrificial layer 945 in an organic solvent such as N-Methylpyrrolidone (NMP). A typical method of removing seed layer 932 is wet-etching that dissolves the metal, or ion-milling, which is a physical method of removing thin metal film by accelerated ions in low-pressure plasma.

In step 870 of process 800, process 800 ends resulting in a micro-electromechanical signal transmission line configured with a first distal end and a second distal end moveable relative to the first distal end in accordance with an embodiment of the present invention.

Advantageously, the present invention, in the various presented embodiments allows for the fabrication of a signal transmission line that is very small in size and proportion resulting in a micro-electromechanical signal line. The present invention in the presented embodiments allows the micro-electromechanical signal line to have relative motion between its two distal ends so as to not impede the function of a microactuator. Additional advantage is realized in that the capacitive reactance is groomed to a prerequisite impedance through setting fabrication parameters, thereby achieving high frequency signal transmission The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A micro-electromechanical signal transmission line comprising:
   an electrically conductive material;
   a first distal end;
   a second distal end wherein said second distal end is free to move with respect to said first distal end;
   an unsupported region between said first distal end and said second distal end; and
   said unsupported region juxtaposed at a controlled distance from at least one grounded conductive surface;
   wherein said first distal end is configured to couple to a first termination pad, said second distal end is configured to couple to a second termination pad, a length of said unsupported region between said first distal end and said second distal end is in excess of a minimum length required for spanning between said first termination pad and said second termination pad, and said unsupported region between said first distal end and said second distal end is configured to allow unimpeded relative motion between said first termination pad and said second termination pad.

2. The micro-electromechanical signal transmission line of claim 1 wherein said electrically conductive material is a plated material.

3. The micro-electromechanical signal transmission line of claim 1 wherein said first distal end is electrically coupleable to an external signal transmission line.

4. The micro-electromechanical signal transmission line of claim 1 wherein said second distal end is electrically coupleable to an electronic device.

5. The micro-electromechanical signal transmission line of claim 1 wherein said controlled distance is adjustable during the fabrication process such that a selected impedance in said micro-electromechanical signal transmission line is achieved.

6. The micro-electromechanical signal transmission line of claim 1 wherein said unsupported region follows a circuitous route between said first distal end and said second distal end.

7. The micro-electromechanical signal transmission line of claim 6 wherein said ground plane is approximately parallel to a plane containing said micro-electromechanical signal transmission line.

8. The micro-electromechanical signal transmission line of claim 6 wherein said ground plane is approximately equidistant to said micro-electromechanical signal transmission line following said circuitous route.

9. A hard disk drive comprising:
   a base casting for providing coupling points for components and sub-assemblies of said hard disk drive;
   a motor-hub assembly to which at least one disk is coupled allowing rotation of said disk about an axis approximately perpendicular and centered to said disk, wherein said motor-hub assembly is coupled to said base casting, wherein said disk comprising at least one surface of data tracks;
   a magnetic head for reading and writing said data tracks onto said surface;
   a slider comprising said magnetic head;
   a microactuator for adjusting said slider relative to said data tracks is coupled between said slider and a suspension, wherein said suspension is coupled to an actuator assembly for moving said slider arcuately across said data tracks; and
   a flexible micro-electromechanical signal line coupled to said microactuator, said flexible micro-electromechanical signal line comprising:
      an electrically conductive material;
      a first distal end;
      a second distal end wherein said second distal end is free to move with respect to said first distal end;
      an unsupported region between said first distal end and said second distal end; and
      said unsupported region juxtaposed at a controlled distance from at least one grounded conductive surface.

10. The hard disk drive of claim 9 wherein said electrically conductive material is deposited using a plating process.

11. The hard disk drive of claim 9 wherein said first distal end is electrically coupled to an integrated lead suspension line.

12. The hard disk drive of claim 9 wherein said second distal end is electrically coupled to said microactuator.

13. The hard disk drive of claim 9 wherein said second distal end is electrically coupled to said microactuator by a means for reflowing solder.

14. The hard disk drive of claim 9 wherein said unsupported region follows a circuitous route between said first distal end and said second distal end.

15. The hard disk drive of claim 9 wherein said controlled distance is adjustable during the fabrication of said micro-electromechanical signal transmission line such that a selected impedance in said micro-electromechanical signal transmission line is achieved.

16. The hard disk drive of claim 9 wherein said ground plane is approximately parallel to a plane containing said micro-electromechanical signal transmission line.

17. The hard disk drive of claim 9 wherein said ground plane is approximately equidistant to said micro-electromechanical signal transmission line following said circuitous route.

18. A method for fabricating a micro-electromechanical signal transmission line, said method comprising:
   depositing a conductive ground plane on a substrate;
   applying a first sacrificial layer above said ground plane;

depositing a seed layer conducive to electroplating wherein said seed layer covers said sacrificial layer and said ground plane;

applying a second sacrificial layer above selected portions of said seed layer;

electroplating a conductive material onto exposed portions of said seed layer; and removing said first sacrificial layer and said second sacrificial layer such that said conductive material remains as a micro-electromechanical signal transmission line configured with a first distal end and a second distal end moveable relative to said first distal end, and an additional structure adjacent to the signal transmission line that is kept at ground potential.

19. The method of claim 18 further comprising:

fabricating said first sacrificial layer to a predefined thickness whereby said distance of said micro-electromechanical signal transmission line to a ground plane is controlled such that a selected impedance in said micro-electromechanical signal transmission line is achieved.

20. The method of claim 18 further comprising:

fabricating said second sacrificial layer to a predefined width whereby said distance of said micro-electromechanical signal transmission line to a ground plane is controlled such that a selected impedance in said micro-electromechanical signal transmission line is achieved.

* * * * *